United States Patent
Baptist et al.

(10) Patent No.: US 7,131,612 B2
(45) Date of Patent: Nov. 7, 2006

(54) NACELLE INLET LIP ANTI-ICING WITH ENGINE OIL

(75) Inventors: Praba Kharan Baptist, Montreal (CA); Keppel Nyron Bharath, Cornwall (CA)

(73) Assignee: Pratt & Whitney Canada Corp., Longueuil (CA)

( * ) Notice: Subject to any disclaimer, the term of this patent is extended or adjusted under 35 U.S.C. 154(b) by 108 days.

(21) Appl. No.: 10/628,368

(22) Filed: Jul. 29, 2003

(65) Prior Publication Data

US 2005/0023412 A1 Feb. 3, 2005

(51) Int. Cl.
*B64D 15/06* (2006.01)

(52) U.S. Cl. .............. 244/134 R; 244/134 B; 60/39.093

(58) Field of Classification Search ........... 244/134 R, 244/134 C, 134 B; 60/39.093
See application file for complete search history.

(56) References Cited

U.S. PATENT DOCUMENTS

| | | | |
|---|---|---|---|
| 2,160,397 A | 5/1939 | Brammer | |
| 2,304,686 A | 12/1942 | Gregg | |
| 2,435,990 A * | 2/1948 | Weiler | 60/267 |
| 2,474,258 A * | 6/1949 | Kroon | 415/175 |
| 2,581,760 A * | 1/1952 | Miner et al. | 244/134 R |
| 2,663,993 A * | 12/1953 | Mosser | 60/223 |
| 2,709,892 A | 6/1955 | Martin | |
| 3,834,157 A | 9/1974 | Hoffmann | |
| 3,916,859 A | 11/1975 | Fossum | |
| 4,505,445 A | 3/1985 | Allison | |
| 4,782,658 A | 11/1988 | Perry | |
| 4,831,819 A * | 5/1989 | Norris et al. | 60/39.093 |
| 4,914,904 A | 4/1990 | Parnes et al. | |
| 5,284,012 A | 2/1994 | Laborie et al. | |
| 5,558,303 A | 9/1996 | Koethe et al. | |
| 6,079,670 A * | 6/2000 | Porte | 244/134 B |
| 2001/0003897 A1 * | 6/2001 | Porte et al. | 60/39.093 |

* cited by examiner

*Primary Examiner*—Timothy D. Collins
(74) *Attorney, Agent, or Firm*—Ogilvy Renault LLP (57) ABSTRACT

A nacelle for housing a gas turbine engine having a pressurized oil system for lubricating components thereof comprises an inlet lip defining a leading edge of the nacelle, the inlet lip having a conduit therein in fluid flow communication with the pressurized oil system of the gas turbine engine and defining an oil passage for circulation of pressurized engine oil therethrough. The conduit is in heat transfer communication with an outer surface of the inlet lip.

27 Claims, 5 Drawing Sheets

NACELLE INLET LIP ANTI-ICING WITH ENGINE OIL

TECHNICAL FIELD

The present invention relates generally to de-icing and anti-icing systems for use with aircraft engines, and more particularly to a combined engine oil cooler and anti-icing system for an aircraft engine nacelle.

BACKGROUND OF THE INVENTION

Operation of aircraft power plants in adverse weather conditions or at high altitudes can sometimes lead to ice forming on the exposed surfaces of the power plant inlet. The build-up of ice on a nacelle surrounding the power plant limits the quantity of air being fed to the engine. This reduction in inlet airflow can result in a reduction of power output, efficiency and/or cooling capacity of the power plant. Systems used to prevent or remove ice formation on aircraft nose cones or wing leading edges are well known. Engine inlet anti-icing systems are also used and commonly employ a thermal source, such as hot air bled from the engine core or an electrical heating element, which is applied to the nacelle inlet to melt or evaporate ice build-up on the external surfaces thereof. However, hot air bled from the engine core reduces overall engine performance and electrical heating systems draw electrical power which furthers non-propulsive load imposed on the engine.

Heat generated by an aircraft engine is largely absorbed by the lubricating oil circulated therethrough, which is typically then cooled by air flow using an air-oil heat exchanger. Such an oil cooler generally requires a separate air flow feed which directs cooling air from the exterior of the engine nacelle to the oil cooler disposed therewithin.

SUMMARY OF THE INVENTION

It is an object of the present invention to provide an improved anti-icing system for an aircraft engine nacelle.

It is another object of the present invention to provide a system which will prevent ice formation on the aircraft engine nacelle inlet lip and will provide an oil cooler for the engine lubricating oil system.

Therefore, in accordance with the present invention, there is provided a nacelle for housing a gas turbine engine having a pressurized oil system for lubricating components thereof, said nacelle comprising: an inlet lip defining a leading edge of said nacelle, said inlet lip having a conduit therein in fluid flow communication with said pressurized oil system of said gas turbine engine and defining an oil passage for circulation of pressurized engine oil therethrough; and said conduit being in heat transfer communication with an outer surface of said inlet lip.

There is also provided, in accordance with the present invention, a power plant assembly comprising: a gas turbine engine having a pressurized oil system for lubricating components thereof; a nacelle housing said gas turbine engine having an inlet lip defining a leading edge of said nacelle; and a conduit, defined within said inlet lip, communicating with said pressurized oil system for circulation of engine oil therethrough, said conduit being in heat transfer communication with an outer surface of said inlet lip.

There is further provided, in accordance with the present invention, a method of preventing ice build up on a nacelle inlet lip and cooling engine oil, comprising the steps of: providing a nacelle housing a gas turbine engine and having a conduit within an inlet lip thereof defining a circumferential oil passage therein, enabling heat transfer communication between said conduit and an outer surface of said inlet lip; and circulating pressurized engine oil used to lubricate said gas turbine engine through conduit; thereby cooling said engine oil and heating said outer surface of said inlet lip.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Aircraft engine nacelles, and particularly the inlets thereof, must be kept free of ice build-up in order to prevent reduction in the amount of air entering the engine. It follows that ice tends to build up on the outer surface of the nacelle inlet lip as this area receives some of the coldest air that the aircraft engine will encounter during operation. Accordingly, the present invention takes advantage of the high volume of cold air flow at the nacelle inlet leading edge lip to cool the engine lubricating oil. By circulating the hot engine oil through the nacelle inlet lip, rather than through other downstream members of the engine, such as the inlet guide vanes in gas turbine engines for example, the efficiency of the engine oil cooling system is maximized. Particularly, the temperature of air which has entered the nacelle of a gas turbine engine, even before it reaches the combustion chamber, is generally higher than outside the nacelle due to the compression of the inlet airflow. Therefore, by locating the engine oil cooler at the nacelle inlet lip rather than further downstream in the engine, more efficient cooling of the hot engine oil is possible. Further, locating the engine oil cooler in the nacelle inlet lip makes use of an area of the engine which has previously been unused. Although adaptable to all aircraft engine nacelles, the present invention is therefore particularly attractive for compact engine applications and ones which generate a large amount of heat in comparison with conventional gas turbine engines, and therefore which necessitate improved cooling requirements.

The present invention employs engine oil from the pressurized oil system of the gas turbine engine, circulated internally through the nacelle inlet lip, as the heat source to perform de-icing or anti-icing of the exterior surface of the nacelle inlet lip. Although the terms anti-icing and de-icing have slightly different meanings, namely prevention of ice formation and removal of ice formation respectively, the term anti-icing will generally be used herein as the engine oil is preferably continuously circulated through the nacelle inlet lip. However, it is to be understood that the present invention is similarly capable of melting ice already formed on the nacelle, and that accordingly de-icing is also possible. As this arrangement cools the hot engine oil, the need for a separate oil cooler is obviated, provided the heat transfer from the hot engine oil to the icing surface, through the wall of the nacelle inlet lip, is sufficient to adequately cool the oil before it is returned to the engine. The elimination of the convention oil cooler permits significant weight and space savings.

Figure 1:
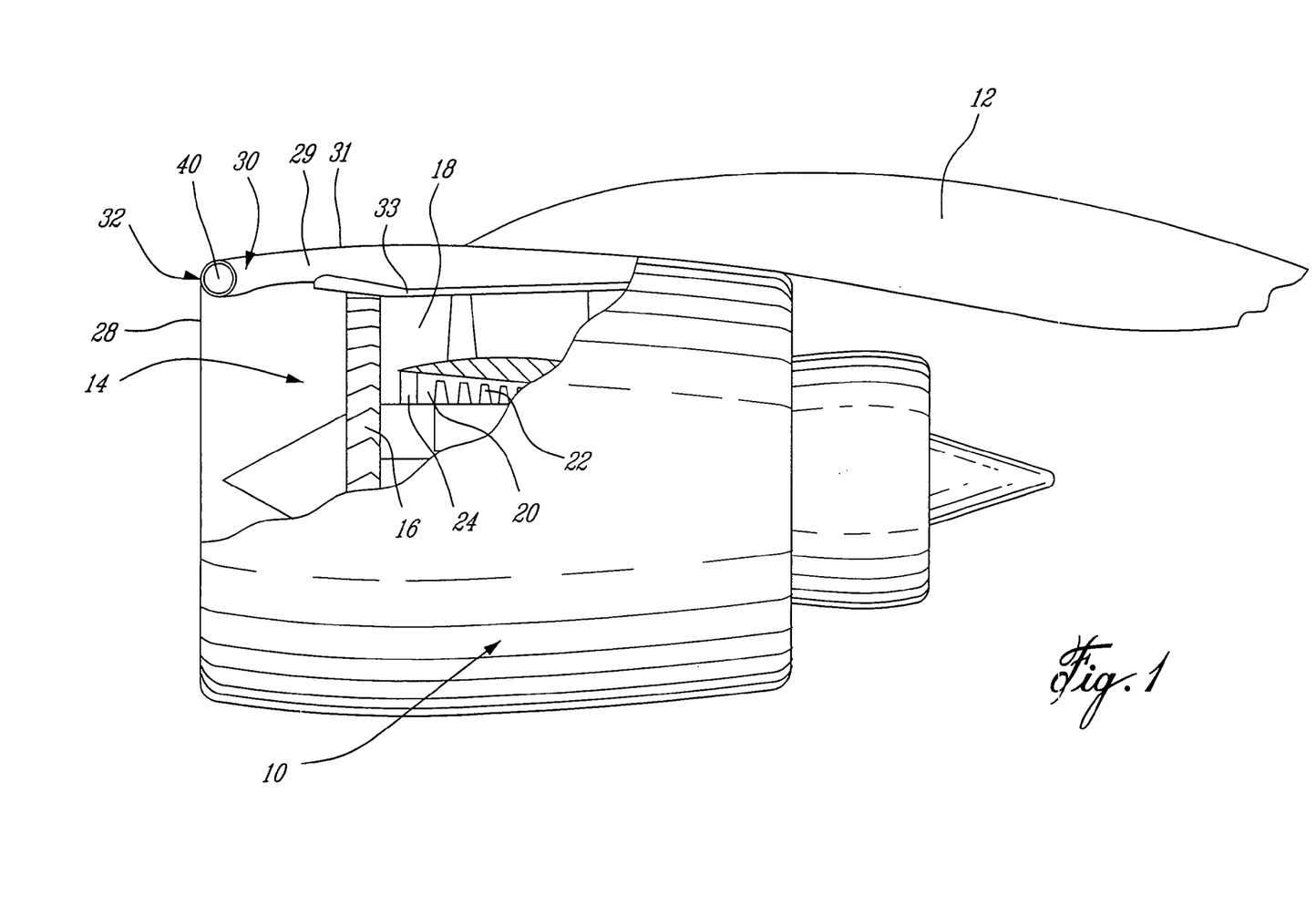
FIG. 1 is a partially sectioned side elevation schematic of an aircraft engine mounted within a nacelle having an inlet lip anti-icing system in accordance with a first embodiment of the present invention.

Referring to FIG. 1, a nacelle 10 of an aircraft power plant 14 is fixed to a mounting structure 12 of an aircraft. The power plant 14 will be preferably described herein as a gas turbine engine, and more particularly as a turbofan, however the nacelle inlet lip anti-icing and oil cooling system of the present invention can be used with any suitable aircraft power plant. The turbofan engine 14, as illustrated in FIG. 1, shows an upstream fan 16 that provides initial compression of the engine inlet airflow which is subsequently split into the outer annular bypass airflow passage 18 and the inner annular engine core airflow passage 20. Generally, inlet guide vanes 24 are disposed at least within the engine core airflow passage 20, upstream of the next compressor stage 22.

The nacelle 10 is generally tubular, having an outer surface 31 and an inner surface 33 substantially parallel to one another and radially spaced apart to define a hollow cavity 29 therebetween. The circumferential inner surface 33 of the nacelle 10 defines the air flow passage to the engine at the upstream end thereof, and defines the annular bypass airflow passage 18 further downstream. At the most upstream end of the nacelle 10 is disposed the inlet lip 28. Within the annular hollow cavity 29 at the inlet lip 28 of the nacelle 10 is disposed a combined anti-icing and oil cooling system 30.

The anti-icing/oil cooling system 30 comprises principally a conduit 34 defining an annular oil passage 40 which preferably extends the full circumference of the nacelle inlet lip 28 within the hollow cavity 29. Hot engine oil, having cooled the turbofan engine 14 is circulated through the oil passage 40, preferably continuously, before it is returned to the engine. The conduit 30 is defined within the hollow cavity 29 close enough to the outer surface 32 of the nacelle inlet lip 28 to permit heat transfer communication between the hot engine oil flowing through the oil passage 40 and the inlet lip icing regions on the outer surface 32 of the nacelle inlet lip 28. Accordingly, heat from the hot engine oil being circulated within the oil passage 40 is transferred to the inlet lip outer surface 32, thereby melting any ice formed thereon and keeping the outer surface 32 sufficiently warm in order to prevent any ice build-up, while cooling the engine oil.

Figure 2:
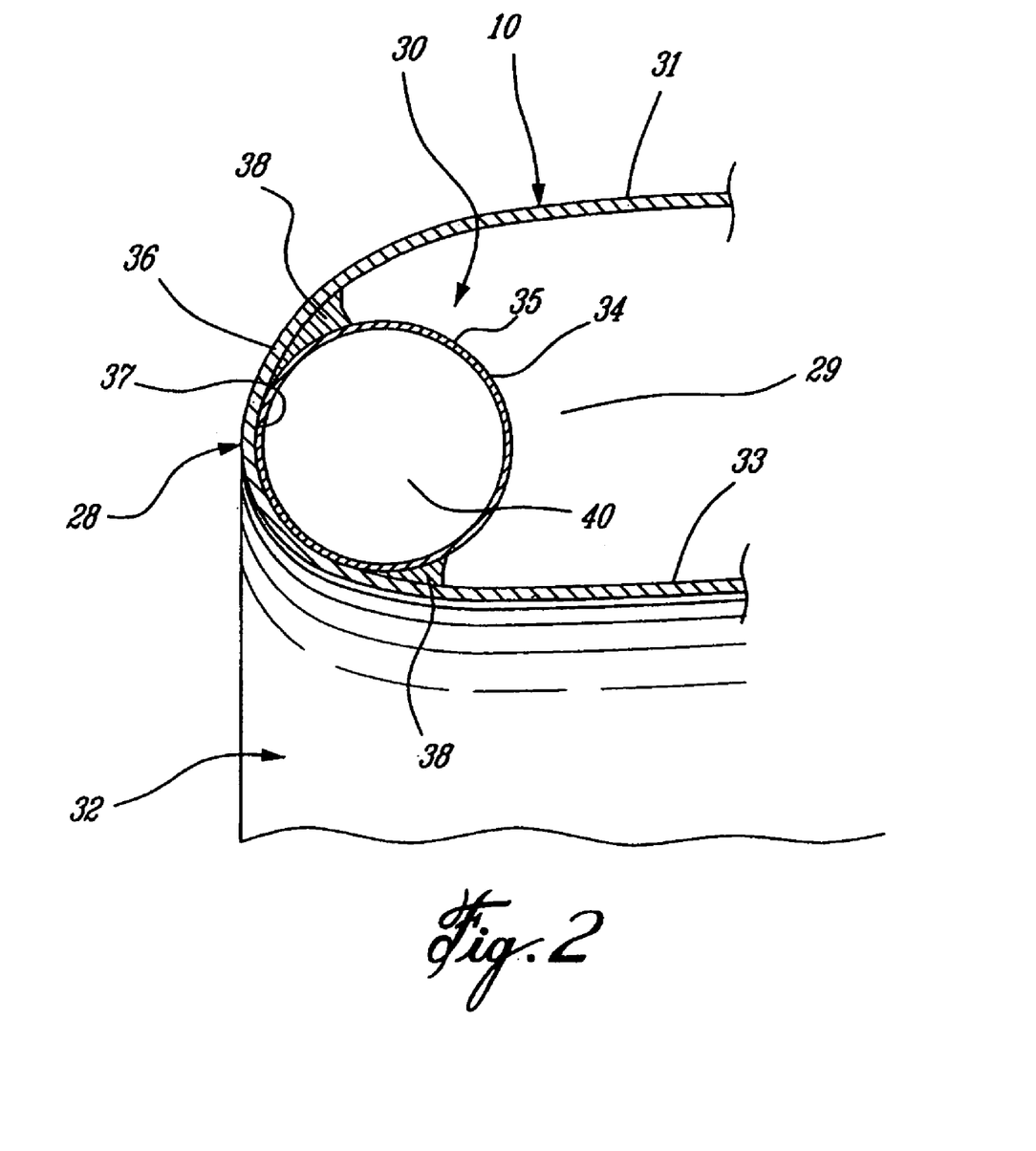
FIG. 2 is an enlarged cross-sectional view of the inlet lip anti-icing system of FIG. 1.

Referring to the embodiment of FIG. 2, the nacelle 10 comprises a circumferentially extending inner surface 33 and a circumferentially extending outer surface 31 radially spaced therefrom to define a hollow cavity 29 therebetween. The inner and outer surfaces 33 and 31 are preferably sheet metal skins integrally joined at the upstream ends thereof with an annular sheet metal lip 36 having a substantially C-shaped cross-section, thereby forming the nacelle inlet lip 28. The conduit 30 of the anti-icing and oil cooling system comprises in the embodiment of FIG. 2 a circumferentially extending tube 34 which defines the oil passage 40 therein. The tube 34 is fixed within the nacelle inlet lip 28 by a permanent fastening means 38 such as a braze, weld, or bond for example. The tube 34 is positioned such that an outer wall 35 of the tube 34 is in contact with the inner surface 37 of the annular sheet metal lip 36, such that heat transfer by conduction can occur therebetween. Inlet and outlet ports in the tube 34 are provided (not shown) for adding and removing the engine oil into the oil passage 40.

Figure 3A:
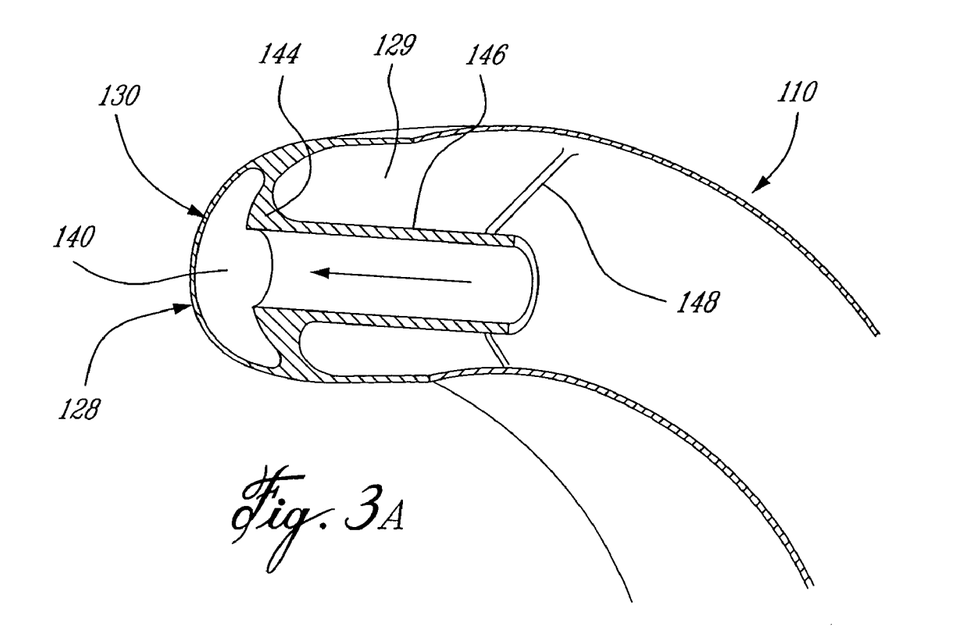
FIG. 3a is a cross-sectional perspective view of a nacelle inlet lip anti-icing system in accordance with a second embodiment of the present invention.

Referring now to a second embodiment of the present invention depicted in FIG. 3a, the nacelle 110 is cast with the conduit 130, which defines the annular oil passage 140, integrally defined within the upstream end thereof. Annular retaining walls 144 within the hollow cavity 129 of the nacelle 110 define the oil passage 140 upstream thereof, between the retaining walls 144 and the curved leading edge of the inlet lip 128. At least an integral oil inlet conduit 146 and an oil outlet conduit (not shown) are similarly cast within the nacelle 110 near the inlet lip 128, such that oil can be pumped into the oil passage 140 and can be withdrawn therefrom once it has sufficiently cooled due to heat transfer to the outer surfaces of the nacelle inlet lip 128. Other structural elements such as support struts 148, which are provided to ensure adequate stiffness, are similarly integrally cast within the nacelle 110.

In contrast to the tube 34 which defines the oil passage 40 in the first embodiment of FIG. 2, the advantage of casting the conduit 130 defining the oil passage 140 within the inlet lip 128 as depicted in FIG. 3a is that the shape and features of the oil passage 140 can be specifically selected and optimized to suit the particular anti-icing requirements for the intended application of the nacelle 110. Further, by casting the entire inlet lip 128 of the nacelle 110, the structure and the integrally defined passages therein can be manufactured to an exact required configuration with very little minimal post-production work, such as finish machining, polishing and welding for example, being necessary. This considerably saves on manufacturing time and expense required for the production of the finished part.

Figure 3B:
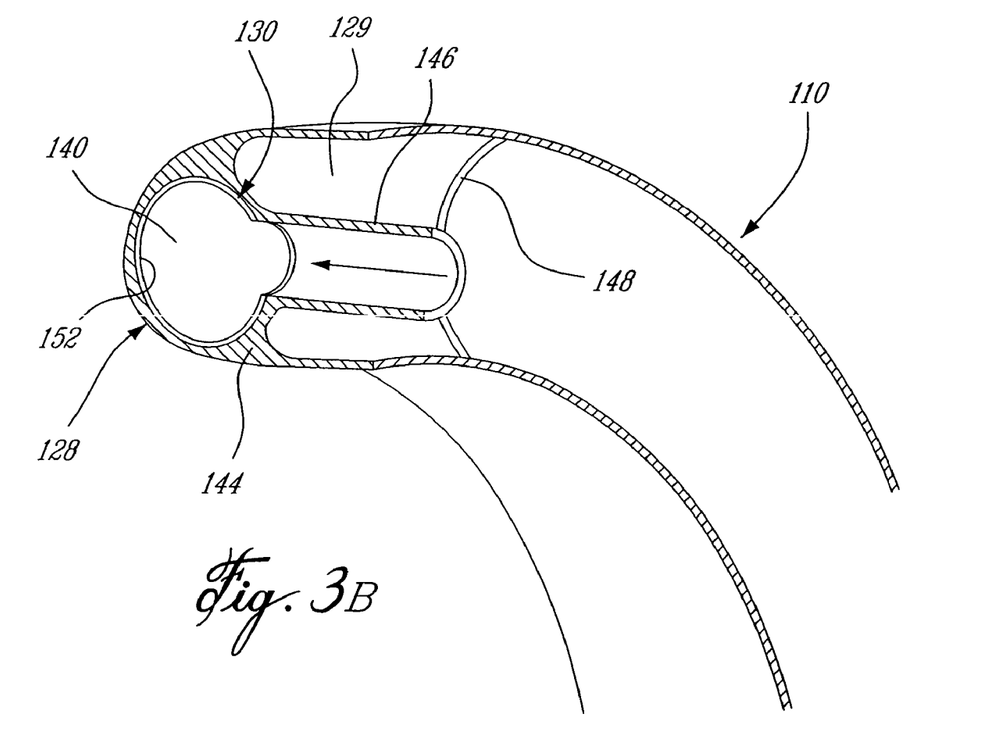
FIG. 3b is a cross-sectional perspective view of a nacelle inlet lip anti-icing system in accordance with a third embodiment of the present invention.

The third embodiment of FIG. 3B is similar to that of FIG. 3A, however the conduit 130 further comprises an internal tube 152, which is integrally cast within the inlet lip 128 and defines the oil passage 140 therewithin. The internal tube 152 extends through the full circumference of the nacelle inlet and is comprised of a metal having a higher melting point than that of the base material of the nacelle 110, such that it can be integrally cast therein. The additional internal tube 152 integrally cast within the nacelle inlet lip 128 provides added protection against potential foreign object damage to the inlet lip 128 in comparison with the tube-less embodiment depicted in FIG. 3A. Therefore, should a foreign object strike the inlet lip 128 of the nacelle 110, the added integrally cast tube 152 further protects the oil passage 140 against a possible breach which would result in oil pressure loss. Another advantage of using an integrally cast tube 152 is that such pre-manufactured tubes are more consistently produced to high tolerances such that exact internal passage sizing is achieved, which permits optimum heat transfer from the hot engine oil to the outer surfaces of the nacelle inlet lip 128.

Figure 4:
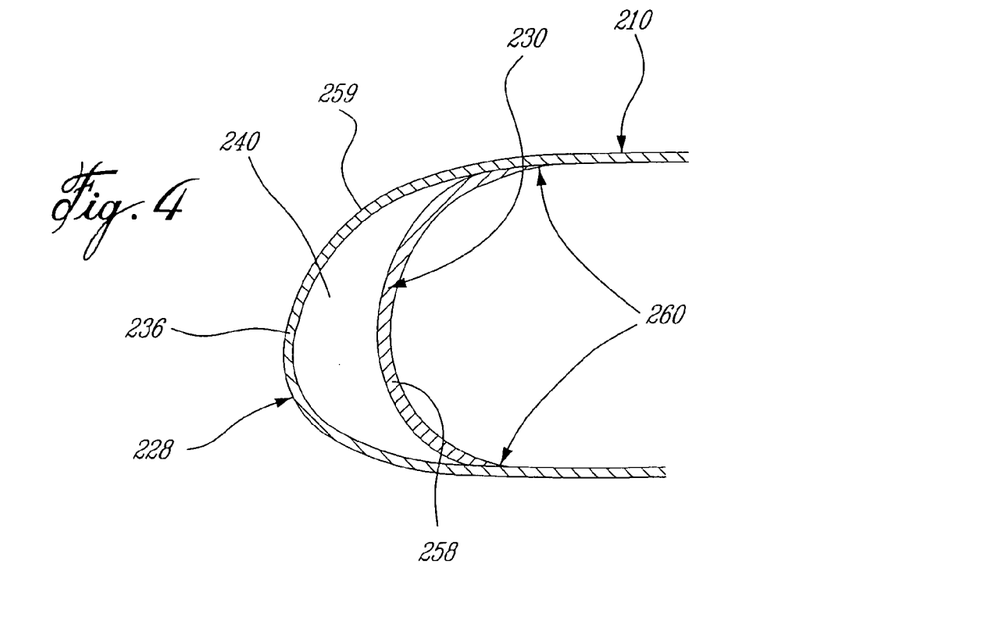
FIG. 4 is a cross-sectional view of a nacelle inlet lip anti-icing system in accordance with a fourth embodiment of the present invention.

Referring to the fourth embodiment shown in FIG. 4, inlet lip 228 of the nacelle 210 comprises a conduit 230 which comprises two adjacent sheet metal liners. Namely an outer liner 259, defining the leading edge 236 of the inlet lip 228, and an inner liner 258 are provided. The inner liner 258 is disposed within the curved upstream end of the outer liner 259 and defines the oil passage 240 therebetween. The inner liner 258 is circumferentially fastened to the interior surface of the outer liner 259 by a fastening means 260 which can include a weld, braze, with the outer liner 259 such that the oil passage 240 retains the engine oil within the annulus defined by the oil passage 240 at the inlet lip 228 of the nacelle 210. Therefore the engine oil can flow between the outer and inner liners 259 and 258, which make up the inlet lip external and internal surfaces. The inner liner 258 is preferably rearwardly concave, which provides a strong structural arrangement for retention of the pressurized engine oil within the oil passage 240. As per the previous embodiments, inlet and outlet conduits (not shown) are provided to permit the engine oil to be introduced and withdrawn from the oil passage 240. The inner liner 258 is further preferably insulated on the rear, non-oil surface, such that heat transfer from the oil to the outer liner 259 is promoted.

Figure 5:
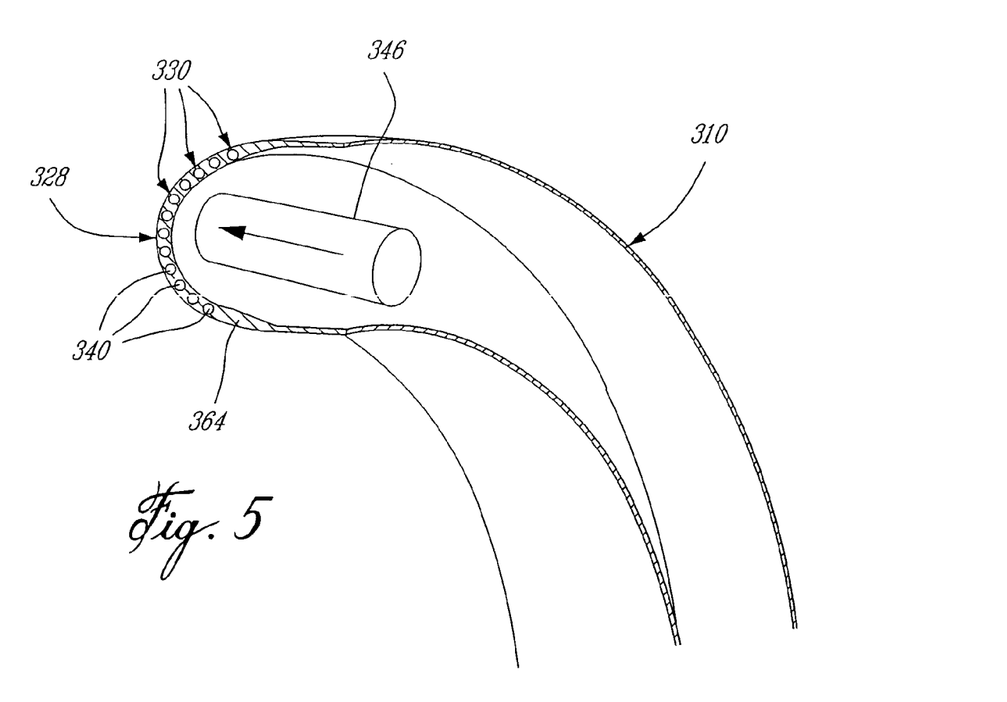
FIG. 5 is a. cross-sectional perspective view of a nacelle inlet lip anti-icing system in accordance with a fifth embodiment of the present inventionr.

In a fifth embodiment of the present invention, depicted in FIG. 5, the nacelle 310 comprises an inlet lip 328 with a cast inlet lip leading edge wall 364 having a plurality of internal annular conduits 330, extending throughout the full circumference of the inlet lip 328 within the leading edge wall 364. Each of the plurality of conduits 330 defines an annular oil passage 340 therewithin, thereby providing a plurality of discrete oil passages for the circulation of engine oil therethrough. At least an oil inlet conduit 346 is provided to permit input of hot engine oil into the multiple annular oil passages 340, and a similar oil outlet conduit (not shown) is also provided. Each annular conduit 330 can also comprise an integrally cast tube therewithin, for added foreign object damage protection as described with regard to the single passage embodiment of FIG. 3b. With or without the internal tubes, this embodiment provides foreign object damage to the inlet lip 328, as it is more unlikely that all of the annular passages 340 will be ruptured if a strike occurs at only one point on the inlet lip 328. A further advantage of this embodiment is that the volume of oil required for circulation within the nacelle inlet lip 328 is less than if a single oil passage is provided, without reducing the anti-icing efficiency on the outer surfaces of the inlet lip leading edge wall 364, and without reducing the oil cooling ability of the anti-icing and oil cooling system 330. Additionally, this embodiment is more structurally rigid, as the plurality of conduits 330 essentially create annular ribs within the inlet lip 328 which add stiffness thereto.

Figure 6:
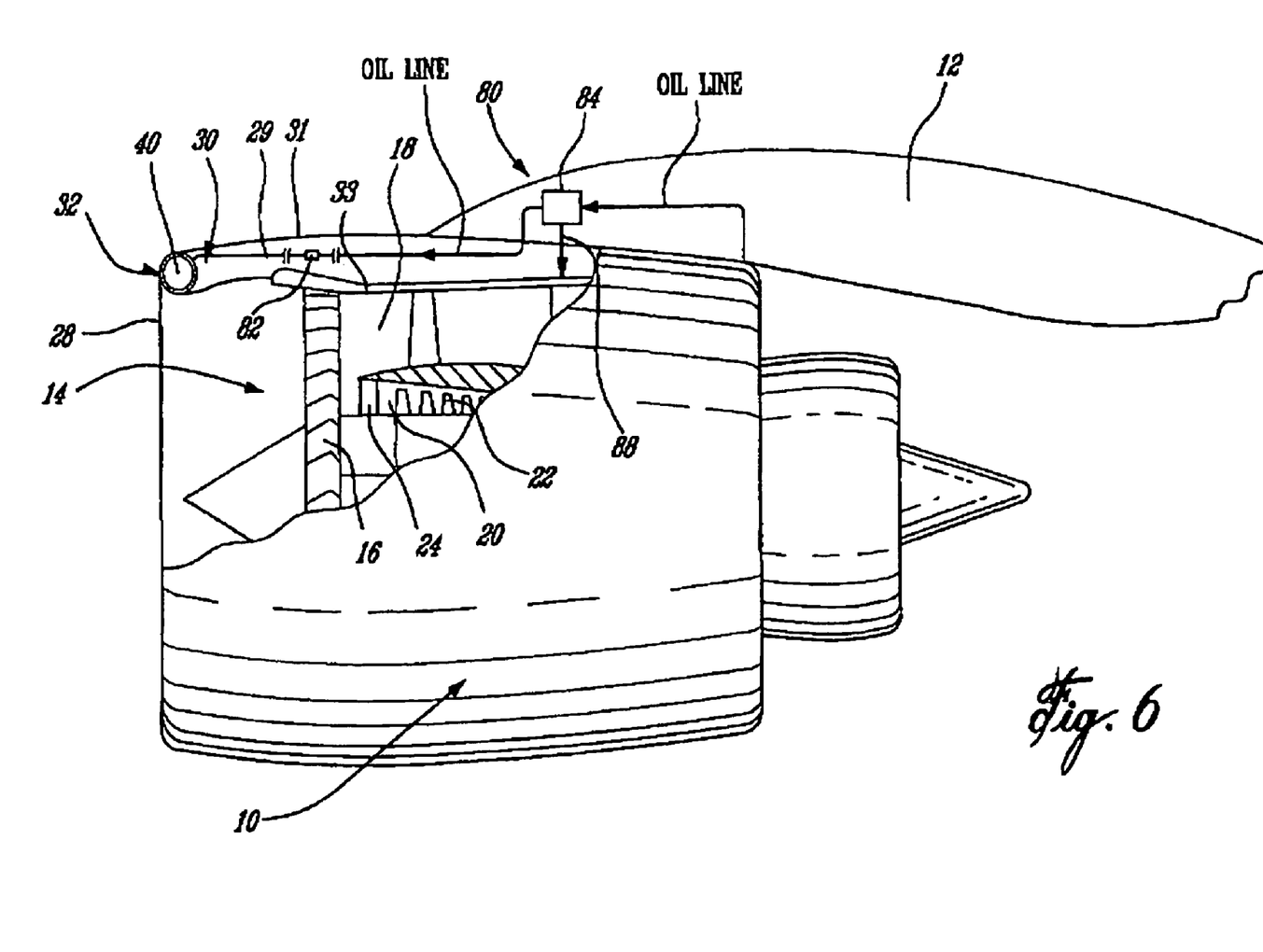
FIG. 6 is a partially sectioned side elevation schematic of an aircraft engine mounted within a nacelle having the inlet lip anti-icing system of FIG. 1, showing a schematic control system used therewith.

As seen in FIG. 6, athere is also preferably included a control system 80 for managing the anti-icing system 30 to ensure that consistent performance to support heat transfer and engine oil circulation is achieved. The control system 80 will also ensure that in case of damage to the inlet lip resulting in a potential oil leak to outside of the passage, the oil flow to the inlet lip will be cut of if and diverted back to the engine, Such an oil leak is detected by at least one sensor 82 disposed in communication with a counter-measure apparatus 84. The counter-measure apparatus 84, which includes for example a shut-off/isolation mechanism, re-routes the oil to a by-pass oil passage 88, thus ensuring that no oil is fed to the inlet lip for ant:L-icing. This guards the engine from the loss of main shaft oil maintaining continuous engine operation.

Additionally, although structural supports 148 are only depicted with regard to the embodiments of FIGS. 3a and 3b, all embodiments preferably also include such stiffeners within the inlet lip of the nacelle, in order to provide adequate protection against possible foreign object damage incidents.

The combined anti-icing and oil cooling system of the present invention has been described preferably with regards to the inlet lip of an engine nacelle. However, it is to be understood that such a system could also be employed within the exposed leading edges of other aircraft surfaces, such as aircraft airfoils including wing leading edge for example, in order to prevent ice build up thereon and in order to cool engine oil. Although this requires a larger volume of oil and may accordingly only be practical for relatively small aircraft, an on-off control system can be included in order to selectively divert the flow of engine oil to the oil passages within airfoil leading edges when necessary. Although the circulation flow of engine oil through the oil passages of the present invention is preferably continuous, an on-off flow control system permits anti-icing of the leading edge surfaces to be selectively performed. However, in this case, elimination of the conventional oil cooler is not possible unless alternative methods of cooling the engine oil are provided when oil is not being circulated through the oil passages to de-ice or prevent ice formation on the exterior surfaces of the nacelle inlet lip or alternative aircraft airfoil surface.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A nacelle for housing a gas turbine engine having a pressurized oil system for lubricating components thereof, said nacelle comprising: an inlet lip defining a leading edge of said nacelle, said inlet lip having a conduit therein in fluid flow communication with said pressurized oil system of said gas turbine engine, said conduit defining an oil passage within which circulates pressurized engine oil therethrough, said conduit being in heat transfer communication with an outer surface of said inlet lip; and a control system to regulate flow of said pressurized engine oil, the control system including at least one sensor for sensing foreign object damage to the oil system and at least one counter-measure apparatus operative to prevent oil leakage from the oil system in the event that said foreign object damage is detected by the said sensor.

2. The nacelle as defined in claim 1, wherein the inlet lip is annular and circumscribes an engine air inlet area therewithin, said conduit being entirely disposed radially outward from the air inlet area.

3. The nacelle as defined in claim 2, wherein the conduit has an inlet and an outlet interconnected by a substantially arcuate flow path extending therebetween and disposed exclusively within said conduit.

4. The nacelle as defined in claim 3, wherein the substantially arcuate flow path extends circumferentially round a substantial portion of the inlet lip.

5. The nacelle as defined in claim 1, wherein the countertreasure apparatus includes a shut-off/isolation mechanism and a by-pass oil passage, such as to divert said pressurized engine oil away from said conduit in the event that such foreign object damage is detected.

6. The nacelle as defined in claim 1, wherein said conduit comprises a tube fixed within said inlet lip.

7. The nacelle as defined in claim 6, wherein said tube is integrally cast within said inlet lip.

8. The nacelle as defined in claim 1 wherein said inlet lip is cast and said conduit is integrally cast therewith.

9. The nacelle as defined in claim 1 wherein said conduit comprises a circumferentially inner liner fixed to an inner surface of said inlet lip, defining said oil passage between said inner surface of said inlet lip and said inner liner.

10. The nacelle as defined in claim 9, wherein said inner liner and said inlet lip are sheet metal.

11. The nacelle as defined in claim 1 wherein said inlet lip comprises reinforcing structural supports.

12. The nacelle as defined in claim 1 wherein said inlet lip comprises a plurality of annular conduits therein.

13. The nacelle as defined in claim 12, wherein said plurality of annular conduits are integrally farmed within said inlet lip.

14. A power plant assembly comprising:
a gas turbine engine having a pressurized oil system for lubricating components thereof;
a nacelle housing said gas turbine engine having an inlet lip defining a leading edge of said nacelle;
a conduit, defined within said inlet lip, communicating with said pressurized oil system for circulation of engine oil therethrough, said conduit being in heat transfer communication with an outer surface of said inlet lip; and
a control system to regulate flow of said engine oil, the control system including at least one sensor for sensing foreign object damage to the oil system and at least one counter-measure apparatus operative by the control system in the event that such foreign object damage is sensed.

15. The power plant assembly as defined in claim 14, wherein the inlet lip is annular and circumscribes an engine air inlet area therewith in, said conduit being entirely disposed radially outward from the air inject area.

16. The power plant assembly as defined in claim 15, wherein the conduit has an inlet and an outlet interconnected by a substantially arcuate flow path extending therebetween and disposed exclusively within said conduit.

17. The power plant assembly as defined in claim 16, wherein the substantially arcuate flow path extends circumferentially around a substantial portion of the annular inlet lip.

18. The power plant assembly as defined in claim 14, wherein the counter-measure apparatus includes a shut-off/ isolation mechanism and a by-pass oil passage, such as to divert said engine oil away from said conduit in the event that such foreign object damage is sensed.

19. The power plant assembly as defined in claim 14, wherein said conduit comprises a tube fixed within said inlet lip.

20. The power plant assembly as defined in claim 19, wherein said tube is integrally cast within said inlet lip.

21. The power plant assembly as defined in claim 14, wherein said conduit is integrally formed within said inlet lip.

22. The power plant assembly as defined in claim 21, wherein said conduit comprises a plurality of oil passages integrally defined within said inlet lip.

23. The power plant assembly as defined in claim 21, wherein said inlet lip is cast and said conduit is integrally cast therewithin.

24. The power plant as defined in claim 14, wherein said conduit comprises a circumferential inner liner fixed to an inner surface of said inlet lip, said oil passage being defined between said inner surface of said inlet tip and said inner liner.

25. The power plant as defined in claim 24, wherein said inner liner and said inlet lip axe sheet metal.

26. The power plant as defined in claim 14, wherein said inlet lip comprises reinforcing structural supports.

27. A method of preventing ice build up on a nacelle inlet lip and cooling engine oil, comprising the steps of:
providing a nacelle housing a gas turbine engine and having a conduit within an inlet lip thereof defining a circumferential oil passage therein, enabling beat transfer communication between said conduit and an outer surface of said inlet lip;
circulating pressurized engine oil used to lubricate said gas turbine engine through said conduit, thereby cooling said engine oil and heating said outer surface of said inlet lip; and
detecting foreign object damage to the conduit using a sensor of a control system, and restricting a flow of said pressurized engine oil within said conduit using a counter-measure apparatus of the control system in the event that such foreign object damage is detected by the sensor.

* * * * *

UNITED STATES PATENT AND TRADEMARK OFFICE
CERTIFICATE OF CORRECTION

PATENT NO. : 7,131,612 B2  Page 1 of 1
APPLICATION NO. : 10/628368
DATED : November 7, 2006
INVENTOR(S) : Praba Kharan Baptist and Keppel Nyron Bharath It is certified that error appears in the above-identified patent and that said Letters Patent is hereby corrected as shown below:

Claim 5, column 6, line 62, delete "treasure" and insert --measure--

Claim 13, column 7, line 16, delete "farmed" and insert --formed--

Claim 15, column 7, line 37, delete "inject" and insert --inlet--

Claim 25, column 8, line 25, delete "axe" and insert --are--

Signed and Sealed this

Thirtieth Day of January, 2007

JON W. DUDAS
*Director of the United States Patent and Trademark Office*